July 24, 1928.

D. R. BAILEY

CRACKER PLATE

Filed Oct. 7, 1924

Inventor.
Daniel R. Bailey
By Harry H. Totten
Attorney.

July 24, 1928.

D. R. BAILEY

CRACKER PLATE

Filed Oct. 7, 1924

Inventor.
David R. Bailey
By Harry H. Totten
Attorney,

July 24, 1928.

D. R. BAILEY

CRACKER PLATE

Filed Oct. 7, 1924

Inventor.
David R. Bailey
By Harry H. Totten
Attorney.

July 24, 1928.

D. R. BAILEY

CRACKER PLATE

Filed Oct. 7, 1924    4 Sheets-Sheet 4

1,678,098

Inventor.
David R Bailey
By Harry A Potter
Attorney.

Patented July 24, 1928.

1,678,098

UNITED STATES PATENT OFFICE.

DAVID R. BAILEY, OF SACRAMENTO, CALIFORNIA, ASSIGNOR TO CALIFORNIA ALMOND GROWERS EXCHANGE, OF SAN FRANCISCO, CALIFORNIA, A CORPORATION OF CALIFORNIA.

CRACKER PLATE.

Application filed October 7, 1924. Serial No. 742,124.

The present invention relates to a nut cracking machine designed particularly for cracking for removal the shells of nuts and more particularly, almonds.

Almonds are, as far as the shells are concerned, of two types, hard shell and soft shell, and these two types of nuts must be treated in a different manner during the shelling thereof to preserve the meat in substantially whole condition. The present invention has for its principal objects to combine in a single apparatus a mechanism for shelling almonds of both the hard and soft type shells.

A further object is to provide means whereby the cracking mechanism may be adjusted so as to effectively crack the shells of either type of nut and at the same time incur but little injury to the meats thereof.

The invention consists primarily in a nut conveying means and cooperating adjustable cracker plates for operating on nuts of the hard shell type and of adjustable stripper rolls cooperating with one of the cracker plates and the conveying means for effectively fracturing the shells of almonds of the soft shell type, associated devices being incorporated with the principal instrumentalities for driving the same at the proper speeds and in the desired direction, for maintaining the parts under the desired operative tension and for feeding nuts to the apparatus.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To comprehend the invention reference is directed to the accompanying drawings illustrating the preferred embodiment of apparatus for carrying out the desired objects.

In the drawings, Fig. 1 is a view in side elevation taken from the right hand side of the apparatus as viewed from the feed hopper.

Figure 1:
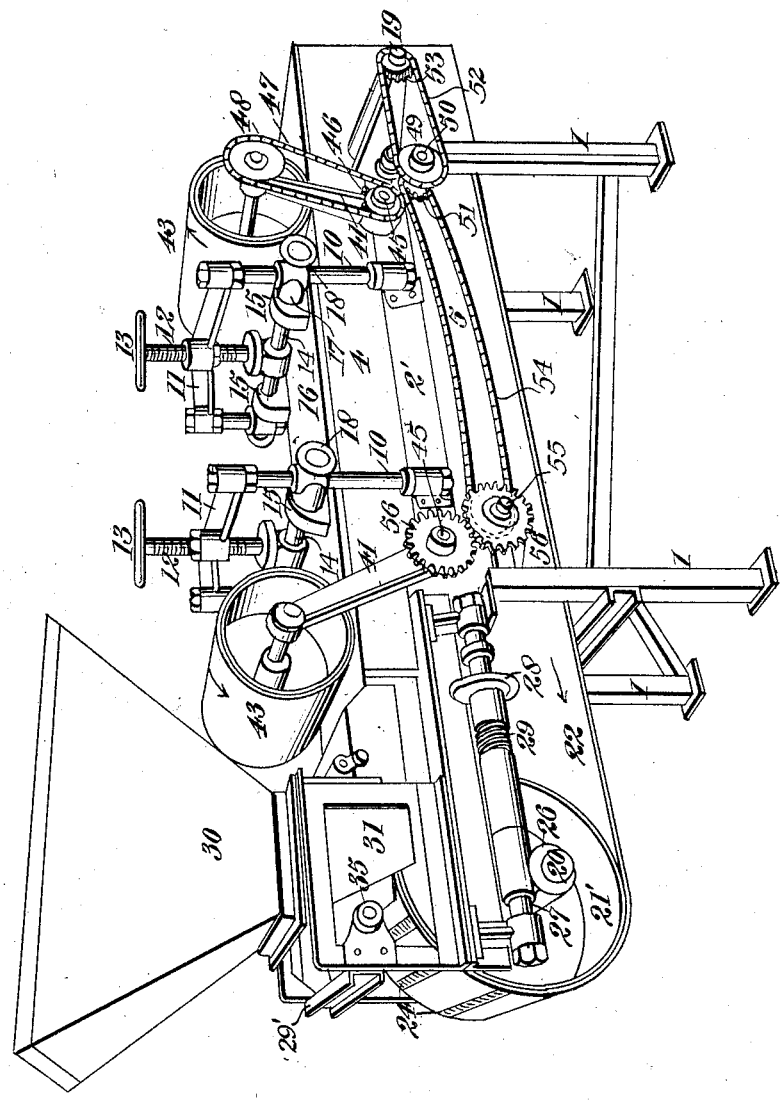
Figure 2:
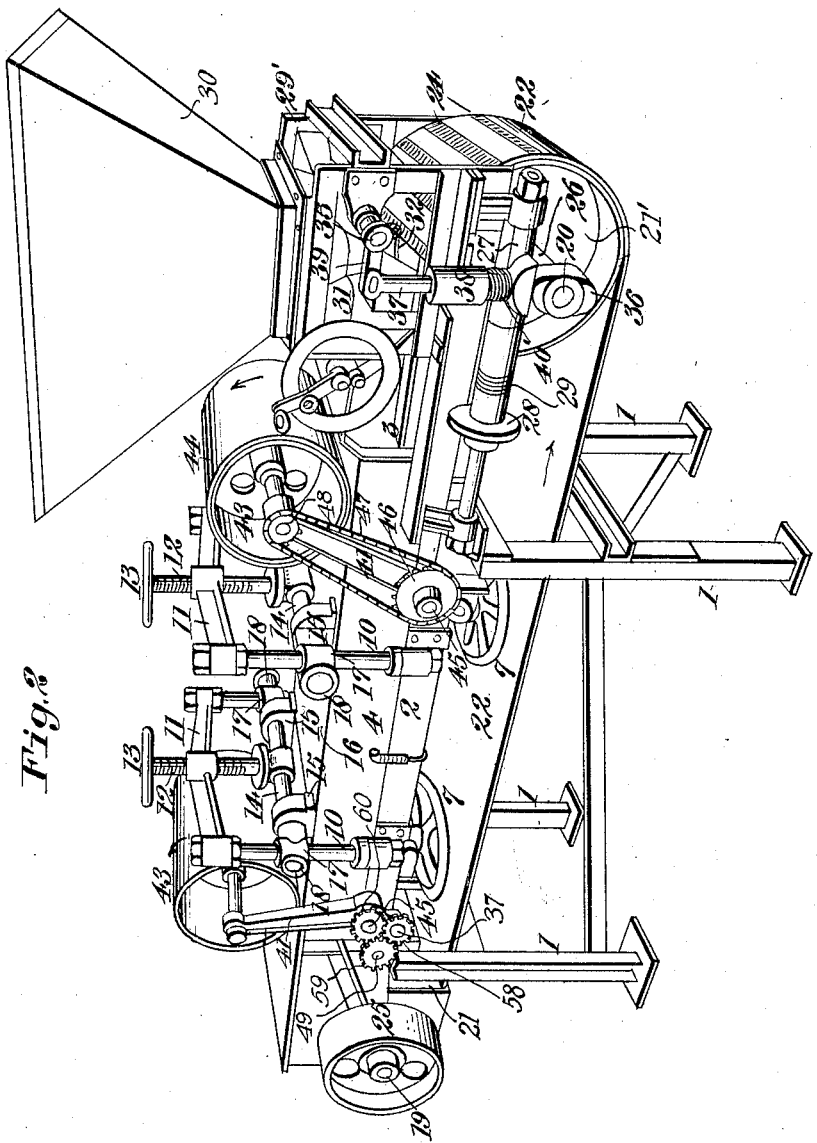
Fig. 2 is a view in side elevation taken from the opposite side of the apparatus to that illustrated in Fig. 1.
Figure 3:
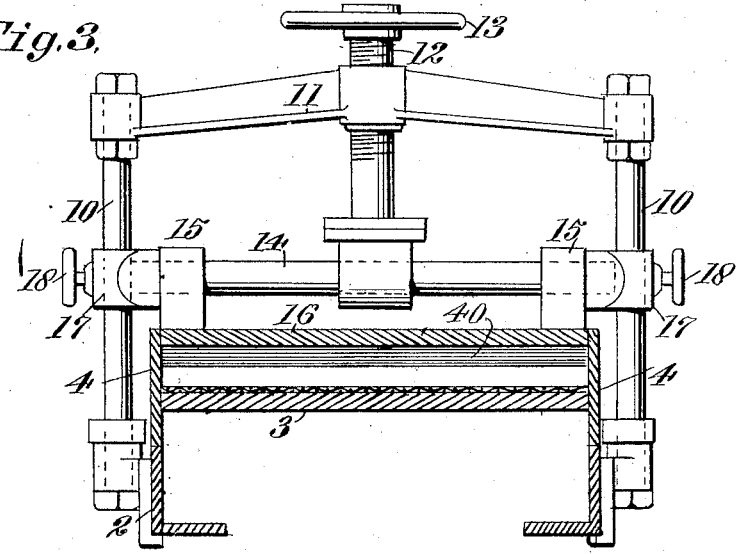
Fig. 3 is a transverse sectional view on line 3—3, Fig. 1.
Figure 4:
Fig. 4 is a view in side elevation of the lower cracker plate.
Figure 5:
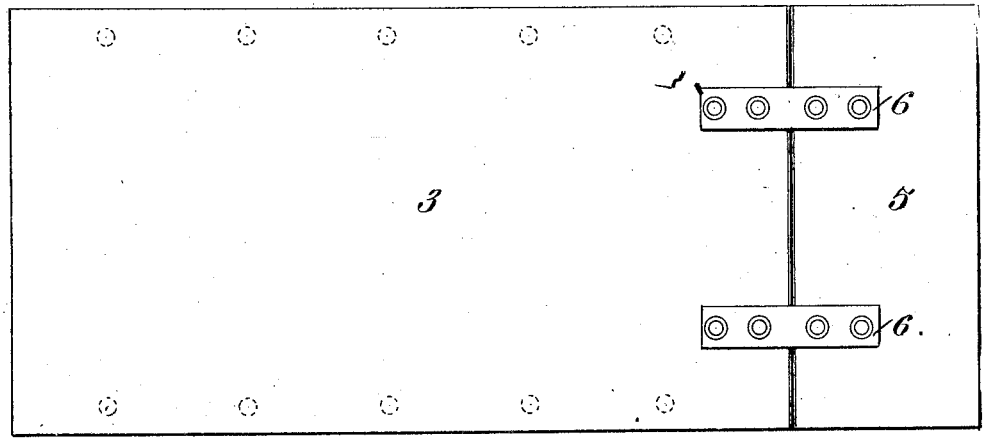
Fig. 5 is a fragmentary bottom plan view of the lower cracker plate.
Figures 6, 8:
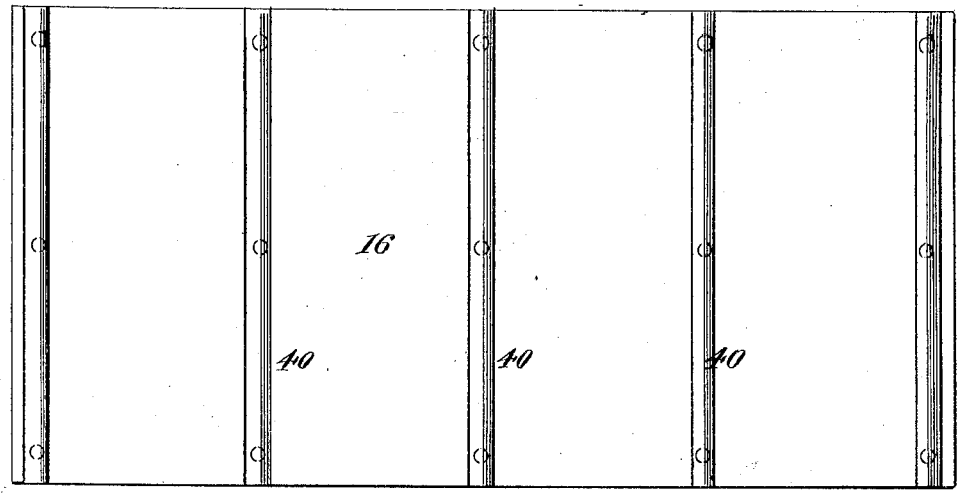
Fig. 6 is a plan view of the under side of the top cracker plate.
Fig. 8 is a view in detail of the hopper valve operating means.
Figure 7:
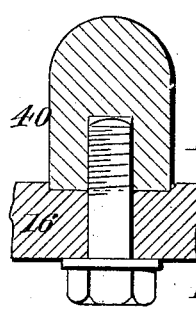
Fig. 7 is a view in detail side elevation of the top cracker plate illustrating one of the cracker bars associated with the under side of the top cracker plate.
Figure 9:
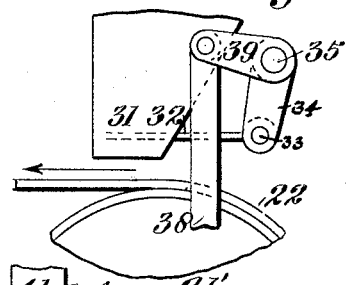
Fig. 9 is a fragmentary plan view of the cracking means on the conveyer belt.
Figure 11:
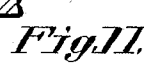
Fig. 11 is a view in detail section of the tubular sleeves with its contained shaft.
Figure 10:
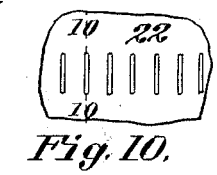
Fig. 10 is a sectional view on line 10—10 of Fig. 9.
Figure 12:
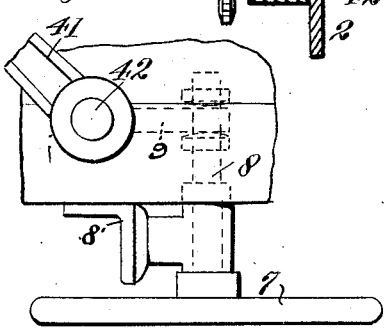
Fig. 12 is a fragmentary view of the stripper roller adjusting mechanism.
Figure 13:
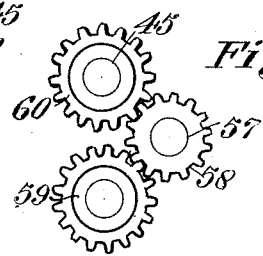
Fig. 13 is a view in detail of the gear trains.

In the drawings wherein like characters of reference designate corresponding parts, the numerals 1 indicate the uprights of a supporting frame mounting parallel spaced bed forming channels 2 and 2'. Between the channels 2 is mounted the lower cracker plate 3 which is of a length slightly greater than that of the side members 4 which rest on the members 2. The lower cracker plate 3 at its end adjacent the feed end of the machine is provided with a yieldable section 5 held to the main portion 3 by strap bars 6 detachably uniting the members 3 and 5 together.

Upwardly from the bed members 2 extend standards 10 arranged in pairs opposite each other and each pair is connected at its upper end by a transverse yoke 11. Each yoke mounts a threaded shaft 12 carrying a hand wheel 13 and said shafts at their lower ends connect through a suitable bearing with a transverse shaft 14, the latter extending through bearing boxes 15 on the upper surface of the top cracker plate 16. The shafts 14 at their ends carry guide sleeves 17 operating over members 10, the sleeves being locked to the members 10 by suitable threaded lock screws 18. The top cracker plate 16 is disposed above the lower cracker plate 3 and is substantially coextensive therewith, its adjustment relative to the lower cracker plate being accomplished by rotating the hand wheels 13 in the desired direction after the members 18 have been released, the members 18 enabling the top cracker plate to be locked in its adjusted position.

Disposed transversely of the bed members at opposite ends of the apparatus are the respective rotatably mounted shafts 19 and 20 mounting the respective belt drums 21 and 21' and around the belt drums operates a conveyor belt 22 of any suitable material such as canvas, the upper flight of which passes over the upper surface of the lower cracker plate 3 and beneath the lower surface of the upper cracker plate 16. The belt 22 on its outer face is provided with transverse rows 24 of conveyor and cracker teeth of any suitable type. One end of the shaft 19 mounts a power wheel 25 for receiving power to operate the belt 22 in the direction of the arrows. The shaft 20 rotates in adjustable journal boxes 26 slidably to and from shaft 19 on guides 27. A portion of each guide 27 is threaded and mounts a hand wheel 28 threaded thereon. Between each hand wheel and the journal boxes 26 are the tension springs 29 coiled about shafts 27. The adjustment of the hand wheels 28 to vary the tension on springs 29 maintains the belt 22 under the desired tension. Carried by an auxiliary frame 29' and above the belt pulley 21' is a feed hopper 30 the discharge end 31 of which terminates immediately above the upper flight of belt 22 at a point over the belt pulley 21'. The discharge of nuts to be cracked from the hopper 30 onto the belt 22 is controlled by a slide gate 32 mounted to reciprocate across the mouth or discharge end of the hopper 30, the gate being pivotally connected as at 33 to cranks 34 on an oscillating shaft 35 carried by the auxiliary frame 29 and disposed substantially parallel with shaft 20. The shaft 35 is oscillated by a cam 36 on shaft 20 which operates a plunger 37 vertically guided in a bearing 38 and connecting with one end of shaft 35 through a crank 39. A spring 40' normally maintains the plunger 37 in engagement with the periphery of cam 36. Each rotation of the cam 36 imparts a reciprocating movement to the valve 32 alternately opening and closing the mouth or discharge end of the hopper 30, admitting a charge of nuts to be deposited onto the upper flight of belt 22, as the same moves in the direction of the arrow. The top and bottom cracker plates 16 and 3 and the side boards 4 provide an open ended tunnel through which the upper flight of the conveyer passes.

When the apparatus is employed for the cracking of hard shelled almonds the nuts to be cracked are deposited in the hopper 30, hand wheels 13 are rotated to obtain the desired adjustment between plates 16 and 3. Rotation is imparted to shaft 19 and the belt 22 is driven in the direction of the arrows. The nuts with their uncracked shells are conveyed by the members 24 on the belt 22 beneath the cracker bars 40 disposed transversely on the under side of the top cracker plate 16 and in their travel the shells thereof are sufficiently cracked by the action of bars 40 and teeth 24 to release the meats from therein. The shells and released meats are discharged from the apparatus as the upper flight of the belt 22 passes over the belt drum 21 and they are treated in any suitable manner well known in the art for segregating the shells from the nut meats.

When it is desired to utilize the apparatus in the cracking of soft shell almonds the upper cracker plate 16 is sufficiently elevated to permit the conveyed nuts on belt 22 to freely pass beneath the same and in place of the top cracker plate 16 the following mechanism cooperating with the conveyer belt 22 is employed. Extending upwardly from the bed members 2 at points inwardly disposed from the shafts 19 and 20 are the pairs of arms 41 carried by tubular shafts 42 fulcrumed in suitable bearings and laterally from the tubular shaft extend arms 9 having threaded engagement with the adjusting screws 8 carrying the respective hand wheels 7. The screws 8 are mounted in fixed brackets 8'. The free ends of arms 41 mount stripper rolls 43 disposed transversely of the upper flight of the belt 22 adjacent opposite ends of the top cracker plate 3 and the surface of each of said stripper rolls is preferably of yielding material such as rubber, indicated as at 44. Within each tubular shaft 42 is rotatably mounted a shaft 45, each of which mounts a sprocket 46 connecting through a chain 47 with a sprocket 48 on the shaft of the respective stripper rolls 43. The ratio between the sprockets 46 and 48 is such as to impart a speed to the stripper roll adjacent to the feed hopper greater than that of the travel of the belt 22 and to operate the stripper roll remote from the feed hopper rotating in a direction reverse to the travel of the belt at a speed reduced from that of the belt. To rotate the shafts 45 I provide a jack shaft 49 adjacent the shaft 19 and the same carries a pair of sprockets 50 and 51, the sprocket 50 being connected through a chain 52 with a sprocket 53 on the end of shaft 19 and the sprocket 51 connects through a chain 54 with the sprocket on a suitable jack shaft 55 rotatably mounted beneath the shaft 45 of the stripper roll adjacent the feed hopper 30. The latter shaft and the jack shaft 55 are interconnected by intermeshing gears 56. To transmit power from the jack shaft 49 to the shaft 45 adjacent the discharge end of the apparatus, I provide a counter shaft 57 and on the same mount a gear 58 intermeshing with a gear 59 on the counter shaft 49 and also the gear 60 on the shaft 45, thus driving the shaft 45 in the direction of the arrow.

In operating on soft shell almonds, the upper cracker plate is elevated as heretofore described and the hand wheels 7 are operated to present the arms 41 carrying the respective stripper rolls in the desired proximity to the upper flight of the belt 22. Power applied to move the belt in the direction of the arrow also rotates the stripper rolls in the direction of their respective arrows, the one adjacent the feed hopper with the belt at a speed greater than the belt and the one adjacent the discharge end of the machine in a direction reverse to the belt. The action of these stripper rolls on the nuts conveyed by the upper flight of the conveyor belt is such as to rub or roll the unshelled cracked nuts on the conveyor belt, the action being assured, due to the yielding surface of the stripper rolls which enables the shelled nut to slightly imbed therein. Thus the shells of the soft shell almonds as conveyed by the belt 22 are subjected to a shredding action when they pass beneath the stripper roll 43 adjacent the feed hopper and are further subjected to a shredding action when they encounter the stripping roll 43 rotating in a direction reverse to the belt adjacent the discharge end of the apparatus.

I claim:

1. A nut cracking apparatus comprising a framework, an endless conveyor mounted in said frame having an upper horizontal flight, said conveyor having a plurality of cracking elements secured thereto in a predetermined manner, a cracker plate mounted in the frame and supporting the upper horizontal flight of said conveyor, roller frames pivotally mounted on said framework, cracker rollers rotatably mounted in said frames for cooperation with said conveyor at points overlying said cracker plate, means for adjusting said roller frames on their pivots, and driving means for the rollers and conveyor.

2. A nut cracking apparatus comprising a framework, an endless conveyor mounted in said framework having a substantially horizontal upper flight, nut cracking elements mounted on said belt in a predetermined manner, a cracker plate mounted in the frame and supporting the horizontal flight of said conveyor, roller frames pivotally mounted on said framework, independently operated means for adjusting each of said roller frames, cylindrical nut cracking members rotatably mounted in said roller frames, yieldable sleeves mounted on the peripheries of said cylinders, said sleeves having cracking cooperation with the conveyor over said cracker plate, and driving means for the conveyor and rollers.

3. A nut cracker apparatus, comprising a framework, conveyor rolls rotatably mounted in the end portions of the framework, an endless conveyor mounted on said conveyor rolls having a horizontal flight between said rolls, a cracker plate mounted in said framework between said rolls supporting the horizontal flight of said conveyor, nut cracking elements mounted on said conveyor, a pair of shafts rotatably mounted in the framework in spaced relation, supporting arms mounted for rocking movement on said shafts, cracking rollers, rotatable in said arms and adjustable for cracking cooperation with said conveyor over said cracker plate, means for rotating said shafts and driving said conveyor, and driving connections between the shafts and cracking rollers.

In testimony whereof I have signed my name to this specification.

DAVID R. BAILEY.